United States Patent Office 3,461,106
Patented Aug. 12, 1969

3,461,106
POLYURETHANE FIBERS
Harald Oertel and Heinrich Rinke, Leverkusen, Wilhelm Thoma, Cologne-Flittard, and Friedrich-Karl Rosendahl, Leverkusen-Schlebusch, Germany, assignors to Farbenfabriken Bayer Aktiengesellschaft, Leverkusen, Germany, a corporation of Germany
No Drawing. Filed May 21, 1965, Ser. No. 457,800
Claims priority, application Germany, May 23, 1964, F 42,970
Int. Cl. C08g 22/04, 22/06
U.S. Cl. 260—75                                    11 Claims

ABSTRACT OF THE DISCLOSURE

Segmented polyurethane elastomers having improved dyeability containing a repeating unit and having at least one carboxylic acid hydrazide grouping and at least one tertiary amino group. The polyurethane elastomers being prepared by reacting a substantially linear NCO terminated prepolymer with a chain extending agent containing at least one carboxylic acid hydrazide group and at least one tertiary amino group alone or in mixture with other chain extending agents, said reacting being effected in an inert polar organic solvent. Elastic fibers are prepared from the obtained polyurethane elastomer solution by known spinning processes.

---

This invention relates to novel polyurethane elastomers having a segmented structure and to a process for preparing these elastomers. Furthermore this invention relates to fibres, filaments and foils prepared from these polyurethane elastomers.

The preparation of polyurethane elastomers by the diisocyanate polyaddition process from high molecular weight, substantially linear polyhydroxy compounds, polyisocyanates and chain lengthening agents which have reactive hydrogen atoms by reaction in highly polar organic solvents is already known. In particular, polyurethane elastomers prepared in highly polar organic solvents are also used for forming filaments and fibres which are used for many different purposes in the textile industry, especially in the corsetry and underwear industry, for bathing wear, elastic garments or stockings, if desired as core spun elastomer yarns spun round with filaments or staple fibre yarns or as staple fibre admixture to non-elastic fibres for the purpose of improving the wearing qualities of fabrics which are not in themselves highly elastic.

Elastic polyurethane filaments have numerous advantages over rubber filaments; thus they can be obtained in practically any degree of fineness for textile purposes, they have a higher tensile strength and abrasion resistance and in many cases higher resilience, they are largely resistant to cosmetic oils and solvents used in dry cleaning and they have a high resistance to oxidation and ozone. Furthermore, in contrast to rubber filaments, polyurethane elastomer threads can be dyed relatively easily with certain classes of dyestuffs, e.g. dispersion dyes.

Owing to the special structure of polyurethane elastomer filaments, which consist at least up to about 70% of amorphous constituents (components of the high molecular weight polyhydroxy compounds), these elastomer threads take up certain dyestuffs (e.g. dispersion dyes) relatively easily but these dyes can very easily diffuse out of the elastomer substance again, e.g. in washing, so that such dyeings are usually of poor (wet) fastness. The same applies to dyeings obtained with so-called acid dyes, chrome dyes or after-chroming dyes, which also have insufficient fastness, frequently accompanied by insufficient absorption rates and depth of colour of the dyeings, factors which also have a negative effect on the fastness of such dyeings to abrasion. Further, the overdyeing properties are in many cases inadequate owing to the poor wash fastness of the dyeings. If, however, polyurethane elastomer fibres are to be widely used for textile purposes, the obtaining of deep and fast dyeings is essential. This applies especially to the use of important groups of dyes such as acid dyes, metal complex dyes or chrome dyes with which fast dyeings in deep colour tones can be obtained e.g. on polyamides which are used preferentially in conjunction with elastic polyurethane threads. The stability of polyurethane elastomer threads and foils to discolouration in light and to yellowing under the effect of atmospheric waste gases (especially nitrous gases and waste gases of combustion) still leaves room for improvement. The dyeability of these polyurethane elastomers, especially those used for the production of highly elastic filaments or foils, especially with dyes from the group of acid dyes, metal complex dyes or after-chroming dyes, which preferably contain acid groups in the dye, is markedly improved. In the preparation of polyurethane elastomers by the diisocyanate polyaddition process from high molecular weight, polyurethane elastomers and filaments and fibres thereof having a high elastic recovery, substantially linear polyhydroxy compounds, polyisocyanates and chain lengthening agents having reactive hydrogen atoms by reaction in highly polar organic solvents, the chain lengthening agents used are compounds which contain at least one of the reactive hydrogen atoms in the form of an

—X—CO—NHNH$_2$ group (X=hydrocarbon or O, NH or N-alkyl) and in addition contain one or more tertiary amino groups and in which all the carbon atoms directly attached to the tertiary nitrogen atom are aliphatic carbon atoms. These polyurethane elastomers contain 20 to 1000 milliequivalents of tertiary nitrogen—resulting from the chain extending agent—per kg. elastomer. In particular, these chain extending agents to be used according to the invention can also be added to the known chain lengthening agents with reactive hydrogen atoms in quantities such that the finished polyurethane elastomers contain 20 to 400 milliequivalents of tertiary nitrogen per kg. of elastomer substance. The quantity of hydrazide compound to be used according to the invention usually sufficient for increasing the dyeability is generally less than 50 mol percent and frequently even less than 30 mol percent and especially less than 15 mol percent of the total quantity of chain lengthening agents required for the reaction. The modification in the molecular construction which results has practically no effect on the mechanical or elastic properties of the elastomer substance. On the other hand, in addition to the dyeability numerous other properties of the elastomers and their solutions are highly improved.

These polyurethane elastomers having an essentially linear segmented structure, consist of the reaction product of an NCO-preadduct from a diisocyanate and an essentially linear polyhydroxy compound having terminal hydroxyl groups and a molecular weight from about 500 to about 5000 with an organic nitrogen-containing chain extender compound, said polyurethane elastomer containing a repeating unit having at least one tertiary nitrogen atom of the formula

wherein A is a member of the group consisting of the O-group, the >NH—group and the group

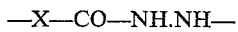

X is a member of the group consisting of oxygen, the NH—group and the >N—R group; Y is a bifunctional radical consisting of the piperazine radical, an alkyl-piperazine radical, the radical

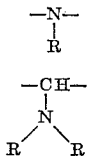

and the radical

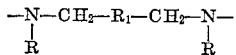

R is lower alkyl, $R_1$ a member of the group consisting of phenylene and cyclohexylene, Z an aromatic bivalent radical and $n$ an integer from 1 to 6; said repeating unit being present in an amount of according 20 to 1000 milliequivalents of tertiary nitrogen per kg. of said polyurethane elastomer.

Especially improved properties are shown by a polyurethane elastomer having an essentially linear segmented structure, consisting of the reaction product of a NCO-preadduct from a dissocyanate and an essentially linear polyhydroxy compound having terminal hydroxyl groups and a molecular weight from about 500 to about 5000 with an organic nitrogen-containing chain extender compound, said polyurethane elastomer containing a repeating unit (a) having at least one tertiary nitrogen atom of the formula

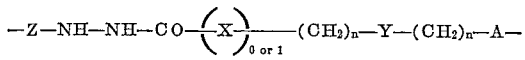

wherein A is a member of the group consisting of the O-group, the >NH—group and the group

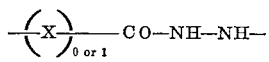

X is a member of the group consisting of oxygen, the NH—group and the >N—R group; Y is a bifunctional radical consisting of the piperazine radical, an alkyl-piperazine radical, the radical

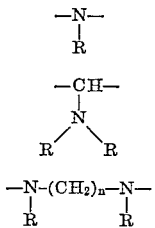

and the radical

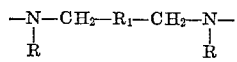

R is lower alkyl, $R_1$ a member of the group consisting of phenylene and cyclohexylene, Z an aromatic bivalent radical and $n$ an integer from 1 to 6; the repeating unit (a) being present in an amount of from about 20 to about 1000 milliequivalents of tertiary nitrogen per kilogram of the polyurethane elastomer and a repeating unit (b) of the formula

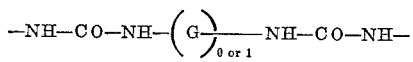

wherein G is an alkylene group, a cycloalkylene group, a cycloalkylene group, a xylylene group or the group —NH—CO—NH—; at least some of said units being connected by urethane linkages being attached to the residues of the linear polyhydroxy compound; said repeating unit being present in an amount according to 20 to 400 milliequivalents of tertiary nitrogen per kg. of said polyurethane elastomer.

Due to the slight modification in the molecular construction, the solubility is highly improved and the stability of the elastomer solutions increased. Such a modification is an advantage, especially when very high melting polyurethane elastomers (M.P. above 250°) are to be built up with chain extending agents such as cycloaliphatic and aromatic diamines, especially 1:4-diaminocyclohexane and p-xylylenediamine, in which those chain segments which contain urea groups generally cause great reduction in the solubility with the result that the solutions are not stable or immediately become pasty so that they cannot be subjected to shaping processes.

It is noteworthy that due to the slight modification by the process according to the invention, much more stable solutions can be obtained which are fluid for a longer period and can therefore readily be spun.

By suitable choice of the proportions of modifying hydrazide compounds it is possible to obtain polyurethane fibres which readily permit at tone in tone dyeing with the surrounding yarns or with other fabric components, which makes it possible to use such elastomer filaments for many different purposes in the textile industry.

In addition, formed articles such as filaments or foils obtained from the polyurethane elastomers according to the invention have also increased resistance to yellowing on prolonged standing in air or when exposed to the action of nitric oxides or waste gases of combustion or to light, especially to UV radiation. Much lighter coloured threads and foils are obtained also in dry spinning or in casting of the elastomer solutions. This applies especially to the relatively easily discoloured polyurethane compositions obtained by chain lengthening with aromatic diamines or water.

The tertiary amino groups incidentally accelerate the reaction between the NCO groups and the reactive hydrogen atoms of the other components, in particular the reaction of the pre-adduct which has free NCO groups with an organic chain lengthening agent which has reactive hydrogen atoms. If these are aliphatic diamines or hydrazines, the catalytic acceleration is hardly of any importance but the situation is different when glycols are used as chain lengthening agents. It is found, surprisingly, that the presence of these tertiary amino groups in the product of the process have practically no effect on the resistance of the polyurethane elastomers to hydrolysis.

It may be mentioned here that polyurethane elastomers suitable for dyeing can also be obtained if by the process according to the invention the specified hydrazide compounds are used as the sole chain lengthening agents and the resulting polyurethane elastomers are added in amounts of about 5 to 20 percent to the usually elastomer substances which cannot be dyed or only inadequately. In addition, polyurethane elastomers which have a relatively high content (more than 50 mol percent of the chain lengthening agent) of dihydrazide compounds which contain tertiary amino groups are also soluble in organic acids such as anhydrous formic acid whereas the corresponding polyurethanes without the chain lengthening agents used according to the invention are not soluble in this solvent.

It is of practical value that the polyurethane elastomer filaments modified according to the invention manifest no migration of substances during dyeing, not even in acid, aqueous solution. This migration of substances is a very disturbing phenomenon observed when low molecular weight or even relatively high molecular weight additives of tertiary amines are used and it manifests itself in a dyeing which is not fast to washing or abrasion.

The chain lengthening agents in which at least one of the reactive hydrogen atoms is present as the

—X—CO—NHNH$_2$ group contain one and preferably several tertiary amino groups in the molecule. These may for example carry aliphatic, cycloaliphatic or araliphatic substituents on the nitrogen atom but the C-atoms that are directly attached to the nitrogen atom must invariably be aliphatic carbon atoms. It has been found that even if only one of these aliphatic groups is substituted by an aromatic group then no increase or only an insufficient increase in the dyeability will be obtained. Suitable substituents are, in particular, low, straight chained or branched alkyl or alkylene radicals, e.g. $C_1$–$C_6$ alkyl or alkylene radicals, but in principle it is also possible to incorporate longer radicals, e.g. the palmitic or stearyl radical, for example for the sake of improved solubility. The tertiary amino group may be present in the chain or in a side chain. The hydrazide compounds have preferably two

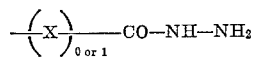—CO—NH—NH$_2$ groups (X denotes a O, NH or N-alkyl, i.e. the group represents a carboxylic acid hydrazide-, carbazinic ester-, semicarbazide- or N-alkylsemicarbazide radical). Such "dihydrazide" compounds have an advantageously diminished reactivity to isocyanates compared with (aliphatic) diamines which react very rapidly with polyisocyanates, frequently with cross-linking reaction. Chain lengthening agents which have reactive hydrogen atoms but only one —X—CO—NHNH$_2$ group contain, in particular, amino- or hydroxy groups as further groups reactive with isocyanates.

In these chain lengthening agents, the end groups are graded in their reactivity to isocyanates, e.g. the amino groups generally react more rapidly, hydroxy groups more slowly with isocyanates than the "hydrazide" groups. Such a graded reactivity may bring advantages with regard to the procedure in the poly-addition process since the molecular construction takes place in two separate stages and consequently it is still possible to take steps to modify the reaction (e.g. stopping the reaction with monofunctional diisocyanates or amines or N:N-dialkyl-hydrazines to break the chain or additional incorporation of branch chains by means of trifunctional isocyanates).

The molecular weight of the hydrazide compounds to be used according to the invention should be below 1000, preferably below 500 and in particular below about 300 molecular weight units.

The chain length between the —X.CO.NH.NH$_2$ groups or the other reactive hydrogen atoms through which the incorporation into the polyurethane molecule takes place should preferably not exceed about 16 chain links and is preferably less than 10 chain links. In general, the shorter the chain length and the more compact the construction as well as the shorter the alkyl groups in the tertiary amino groups, the "harder" will be the elastomers and the higher will be their melting point. The incorporation of cycloaliphatic, heterocyclic or aromatic rings between the —X.CO.NH.NH$_2$ groups also leads to a "stiffening" of the molecular structure.

The chain extending agents of this invention have the general formula

NH$_2$—NH—CO—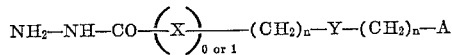(CH$_2$)$_n$—Y—(CH$_2$)$_n$—A wherein A is the OH-group, the NH$_2$-group and the group

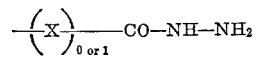—CO—NH—NH$_2$

X is oxygen, the —NH-group or the >N—R-group, Y is a bifunctional piperazine radical, a bifunctional alkylpiperazine radical, the radicals

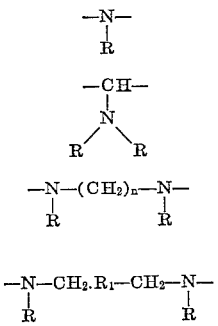

and the radical

—N—CH$_2$.R$_1$—CH$_2$—N—
  |                |
  R                R

R is lower alkyl, R$_1$ phenylene or cyclohexylene or xylylene, and $n$ an integer from 1 to 6.

The following are individual examples of suitable compounds:

N-methylamino-diacetic acid dihydrazide,
N-methylamino-dipropionic acid dihydrazide ($\beta$:$\beta'$-methylamino-dipropionic acid dihydrazide),
N-ethylamino-dipropionic acid dihydrazide,
N-isobutylamino-dipropionic acid dihydrazide,
N-benzylamino-dipropionic acid dihydrazide,
N:N'-dimethyl-ethylenediamine-N:N'-bis-($\beta$-propionic acid hydrazide),
N:N'-dimethyl-hexamethylenediamine-N:N'-bis($\beta$-propionic acid hydrazide),
N,N'-diethyl-ethylenediamine-N,N'-bis-(acetic acid hydrazide),
N:N'-dimethyl-p-xylylenediamine-N:N'-bis($\beta$-propionic acid hydrazide),
N:N'-dimethyl-hexahydro-m-xylylenediamine-N:N'-bis($\beta$-propionic acid hydrazide),
Piperazine-N:N'-bis(acetic acid hydrazide),
Piperazine-N:N'-bis(propionic acid hydrazide),
Trans-2:5-dimethyl-piperazine-N:N'-bis(propionic acid hydrazide),
$\beta$-Dimethylamino-adipic acid dihydrazide,
$\beta$-Diethylamino-adipic acid dihydrazide,
$\beta$-Dibutylamino-adipic acid dihydrazide,
$\beta$-Piperazino-adipic acid dihydrazide,
$\beta$-N-morpholino-adipic acid dihydrazide,
$\beta$-(N-piperazino-N'-methyl)-adipic acid dihydrazide,
$\beta$-(N-methyl-N':N'-dimethyl-propane-diamino)-adipic acid dihydrazide,
$\beta$-N-bis-(N',N'-dimethylpropanediamino)-adipic acid dihydrazide,
N-methylamino-N:N-bis-($\gamma$-propyl-semicarbazide),
Piperazine-N:N'-bis($\gamma$-propyl-semicarbazide),
N-($\gamma$-dimethylaminophenyl)-N:N-bis($\gamma$-propyl-semicarbazide),
3-bis(dimethylaminopropyl)-amine-hexamethylene-1:6-bissemicarbazide,
N-methylamino-bis-hydroxyethyl-carbazinic ester,
N-methyl-N-(3-aminopropyl)-$\omega$-amino-propionic acid hydrazide,
N-methyl-N-(2-hydroxyethyl)-$\omega$-amino-propionic acid hydrazide,
N-methyl-N-(2-hydroxyethyl)-$\omega$-aminoacetic acid hydrazide,
N-ethyl-N-(2-hydroxypropyl)-$\omega$-amino-propionic acid hydrazide,
3-[N-methyl-N-(2-hydroxyethyl)]-amino-propylsemicarbazide.

It has been found that a sufficient increase in the dyeability of polyurethane elastomers can be obtained if the content of tertiary amino groups in the polyurethane elastomers is between about 20 and 400 milliequivalents of tertiary nitrogen per kilogram of elastomer substance. For most practical purposes a content of about 40 to 300 mval./kg., preferably 50–200 mval./kg. is sufficient. This means that in most cases less than 25 mol percent of the usual chain lengthening agents need be "hydrazide" compounds containing tertiary amino groups.

The milliequivalent-value of tertiary nitrogen in the polyurethane elastomer is calculated as follows: 1 mol of e.g. N,N' - piperazino-bis-(propionic acid hydrazide) (258 g.) contains two tertiary nitrogen groups or two equivalents or 2×1000 milliequivalents tertiary nitrogen. In case that 1 kg. polyurethane elastomer is formed with 0.1 mol (58 g.) of the above mentioned substance as chain extending agent, this polyurethane elastomer contains 0.1×2×1000=200 milliequivalents of tertiary nitrogen per kg. elastomer substance.

The properties of the polyurethane elastomers not modified according to the invention are substantially preserved. The use of "hydrazide compounds" which have two tertiary nitrogen atoms, is especially advantageous in this respect.

The polyurethane elastomers can be built up by known methods, for example by reacting dichloroformic acid esters of high moleculer weight polyhydroxy compounds with diamines, hydrazine and if desired further reactive components such as dichloroformic acid esters of glycols or bis-acid chlorides.

In general, it is preferred to carry out the technical synthesis by the diisocyanate polyaddition process although the polyurethanes obtained by the polycondensation process from polychloroformic acid esters have practically the same properties for substantially the same construction as the elastomers obtaintable by the diisocyanate polyaddition process.

Suitable polyhydroxy compounds for building up polyurethane elastomers by the diisocyanate polyaddition process are those which are substantially linear and have mainly terminal hydroxy groups and a molecular weight of about 500 to 5000 and melting points preferably below about 60° C., e.g. polyesters of polycarboxylic acids and polyhydric acohols, polyester amides, polyethers, polyacetals, poly-N-alkylurethanes and mixtures thereof as well as corresponding copolymers e.g. with esters, ethers, acetal-, amide-, urethane-N-alkylurethane- and the urea groups. The melting points of the higher molecular weight polyhydroxy compounds are preferably below 45° C. in order to obtain good elastic and low temperature properties. The polyhydroxy compounds can also be modified with subequivalent quantities of diisocyanates, a simple or multiple prelengthening taking place. The preferred molecular weight is between about 800 and 3000.

Suitable higher molecular weight polyhydroxy compounds are mentioned, for example, in Belgian patent specification 643,811.

Especial mention is to be made of polyesters of adipic acid and if desired mixtures of dialcohols preferably with more than five carbon atoms because polyesters of this type have a relatively good resistance to hydrolysis; also to be mentioned are polyethers, especially polytetramethylene ether diols, which may if desired be used as copolyethers, for example by incorporating a smaller quantity of propylene oxide or ethylene oxide by polymerisation. Especially advantageous properties, particularly fastness to light, are obtained with polyether derivatives in which the OH end groups have been replaced by an

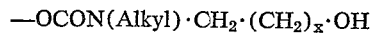

($x=1–4$) group (Belgian patent specification 652,742).

Diisocyanates such as mentioned, for example, in the aforesaid patent specifications may be used for reaction with high molecular weight polyhydroxy compounds. Diphenylmethane - 4:4' - diisocyanate, diphenyldimethylmethane - 4:4'-diisocyanate, isomeric toluylene diisocyanates and aliphatic diisocyanates such as hexane-1:6-diisocyanate or cyclohexane-1:6-diisocyanate have proved to be especially suitable.

The diisocyanates are reacted with the higher molecular weight polyhydroxy compounds in a OH/NCO— ratio of about 1:1.5 to 1:3, the reaction being carried out in the melt or in inert solvents such as dioxane, benzene, chlorobenzene at temperatures of about 40 to 120°, preferably 70 to 100°, and the reaction times observed being such that a substantially linear preadduct with free NCO groups is obtained which on chain extending with about equivalent quantities of chain extending agents yields a substantially linear polymer which is still soluble in solvents such as dimethylformamide or dimethylsulphoxide. The viscosities of the elastomer solutions having a solids content of about 15 to 30 percent should be in the region of about 10 to 1500 poises/20° C.

A modification in the structure of the preadducts, which manifests itself after the chain extending reaction in the formation of elastomers of higher modulus and in some cases elevated melting point and possibly slightly diminished elongation at break can be achieved by using, in addition to the higher molecular weight polyhydroxy compounds, lower molecular weight diols, (molecular weight below about 250) such as ethylene glycol, butanediol and hydroquinone-bis-hydroxyethyl ether, in the reaction with diisocyanates (about 10 to 75% of the OH content of the higher molecular weight polyhydroxy compounds).

As chain extending agents which produce polymeric urethane elastomers by reaction with the preadducts, it is preferred to use difunctional, relatively low molecular weight compounds (molecular weight below 750, preferably below 400, especially below 275) having reactive hydrogen atoms, for example, glycols, diamines, hydrazines, polyhydrazide compounds or polycarboxylic acids.

The following compounds may be mentioned as examples:

ethylene glycol,
propane-1:2-diol,
butane-1:4-diol,
hexane-1:6-diol,
2(3)-methylhexane-1:6-diol,
dihydroxyethylurea,
terephthalic acid-bis-($\beta$-hydroxyethylamide),
hydroquinone-bis-hydroxyethyl ether,
naphthylene-1:5-bis-hydroxyethyl ether,
1:1-dimethyl-4-(bis-$\beta$-hydroxyethyl)-semicarbazide,
succinic acid,
adipic acid,
isophthalic acid,
1:4-cyclohexane-dicarboxylic acid,
ethylenediamine,
hexamethylenediamine,
1:4-cyclohexanediamine,
hexahydro-m-xylenediamine,
m-xylxylenediamine,
p-xylxylenediamine,
bis($\beta$:-aminoethyl)-oxalamide,
piperazine,
2:5-dimethylpiperazine,
ethanolamine,
$\omega$-aminocaproic acid,
$\omega$-hydroxybutyric acid:
4:4-diamino-diphenylmethane,
4:4'-diaminodiphenyl-dimethylmethane,
$\omega$-amino-acetic acid hydrazide,
$\omega$-aminobutyric acid hydrazide,
$\omega$-aminocaproic acid hydrazide,
$\omega$-hydroxyacetic acid hydrazide,
$\omega$-hydroxybutryic acid hydrazide,
$\omega$-hydroxycaproic acid hydrazide,
carbodihydrazide,
hydracrylic acid dihydrazide, adipic acid dihydrazide,
isophthalic acid dihydrazide,
m-xylylene-dicarboxylic acid dihydrazide,
ethyleneglycol-bis-carbazinic ester,
butanediol-bis-carbazinic ester,
ethylene-bis-semicarbazide,
hexamethylene-bis-semicarbazide, hydrazine and hydrazine hydrate or N:N'-diaminopiperazine. Preferred chain extenders having bond the reactive hydrogen directly to the nitrogen atoms are ethylene diamine; 1,3-diaminocyclohexane, m-xylylene diamine, hydrazine or carbohydrazide.

Compounds having more than 2 reactive hydrogen atoms may be added in small quantities (at the most up to about 3 mols percent of the chain lengthening agents), e.g. trimethylolpropane, tartaric acid, citric acid, trihydrazide or aliphatic triamines.

Whereas the reactions of the preadducts with chain lengthening agents having hydroxyl and carboxyl groups (water, glycols, polycarboxylic acids) proceed relatively slowly, the chain lengthening agents which carry $NH_2$ end groups generally react very rapidly with the NCO preadducts so that it is preferred to work not with free hydrazine or diamines but with the carbazinic acids or aminocarbonates formed by the addition of $CO_2$ (Belgian Patent 643,811) or to employ a multistage process in which an excess of chain lengthening agent is initially employed and only then is the desired degree of polymerisation or the desired viscosity of the solutions adjusted, thereby avoiding the difficulties due to the high reactivity of the chain extending agents (Belgian Patent 636,976).

The incorporation of the hydrazide compounds having one or more tertiary amino groups to be used according to the invention into the polyurethane elastomer by reacting the preadduct with the chain lengthening agents can be carried out by known methods capable of many modifications according to the type of starting materials and the processes employed. The preferred temperature to effect the chain extending reaction may be about 0° to about +100° C.

Thus, for example, when a higher molecular weight preadduct is chain lengthened with dihydrazides or bis-semicarbazides in dimethylformamide, these compounds may be dissolved in dimethylformamide together with the hydrazide compounds containing tertiary amino groups (the dimethylformamide being heated if necessary for reasons of solubility), and this solution may be reacted with a solution or a melt of the preadduct, the preadduct being preferably introduced into the mixture of chain lengthening agents.

If the speeds of reaction of the chain lengthening agents differ considerably from each other, e.g. when employing aliphatic diamines (which react more rapidly than the hydrazide compound or polyalcohols or water (which react more slowly), then the molecular structure can be influenced by the manner and sequence of addition. If, for example, mixtures of the hydrazide compounds with diols or water as chain lengthening agents are employed, then the hydrazide compounds at first react preferentially with the preadduct.

If the hydrazide compounds containing tertiary amino groups are added in a controlled manner, e.g. by slow dropwise introduction, to the reaction mixture of preadducts and glycols or dihydrazides or similar chain lengthening agents, a statistically more uniform incorporation of the hydrazide compounds can be achieved as the reaction progresses.

If the hydrazide compounds to be used according to the invention are reacted together with (aliphatic) diamines, then, for example, a solution of the preadduct and a solution of the diamines may both be added simultaneously dropwise to a solution of the hydrazide compounds.

The elastomer solutions obtained may if desired be made to undergo further reactions, e.g. if free amine-, hydrazide- or similar end groups reactive to NCO-groups are present, they may be reacted with di- or polyisocyanates, accompanied by an increase in viscosity, or with monoisocyanates or other "acylating" reaction components such as pyrocarbonic acid diethyl ester, which converts the reactive end groups into inactive end groups. Conversely, free isocyanate groups not yet reacted can be blocked by reaction with monofunctional compounds such as primary or secondary amines (e.g. dibutylamine) or alcohols, substituted hydrazines (e.g. N:N-dimethylhydrazine), hydrazides or semicarbazides if it is desired to prevent any further reaction of the NCO end groups. Pigments, dyes, optical brightening agents, UV absorbents, special light protective agents, cross-linking agents or similar additives may be added to the elastomers.

The elastomers are subjected to shaping processes in particular from solutions thereof. Preferred solvents are organic solvents with a boiling point of below 230° C., preferably below 175° C. containing amide, sulphoxide or sulphone groups and having the capacity to undergo strong hydrogen bond linking, for example dimethylformamide, diethylformamide, diethylacetamide, diisopropylamide, diisopropylproionamide, formyl morpholine, hexamethylphosphoramide, tetramethylurea, dimethylsulphoxide and tetramethylenesulphone.

The usual processes such as wet spinning and dry spinning processes are suitable for producing elastomer filaments. In the dry spinning process, the rates of spinning are about 100 to 800 m./min.; in the wet spinning process they are considerably lower (about 5 to 50 m./min.). Elastomer filaments are also produced by cutting with a foil cutting machine elastomer foils of about 0.10 to 0.20 mm. in thickness. Elastomer foils or coatings can be obtained by application with a brush or a doctor blade on a solid base or textile fabrics or may be applicated by spraying techniques.

The following examples are given for illustrative purposes showing different embodiments of this invention. Measurement of the properties of filaments or foils is carried out as follows:

TS=tensile strength (in g./den.) on a Wolpert instrument

Elg.=elongation (percent) (Wolpert instrument)

TS(B)=tensile strength (in g./den.) at the breaking titre (converted)

The elastic properties are determined with the Elasto-Tensographs described in Chimia 16, 93–105 (1962). The following properties are preferably determined.

M300=tension in mg./den. at 300% elongation of the filament at a speed of elongation of 400%/min.

M150=tension at 150% elongation in the third release cycle after elongating three times to 300% at a speed of 400% per min.

Stress decay=percent tension drop at an elongation of 300% (see 300%/30" above) within 30 seconds at 300% elongation Permanent elongation=percent permanent elongation after three extension cycles (in each case 300% maximum elongation. 400%/min. speed of elongation). 30 second after release of the filament The test in the Fade-Ometer is carried out under normal test conditions.

The material is tested for fastness to waste gases by exposing it to the action of nitrous gases or by 90 minutes exposure to the action of the waste gases from a Bunsen burner at 90°.

Dyeing is carried out according to the standard prescriptions given below, preferably using the following for purposes of comparison:

(a) 2% of red dye according to German Patent 230,594 (Dyeing Prescription A), and (b) 10% of black after-chroming dye cacording to German Patent 164,655 (Dyeing Prescription B).

The use of these dyes is not intended to imply any limitation. These dyes were used merely because of their good response to any change in the dyeability of the elastomer substance.

DYEING PRESCRIPTION A

Treat dyeing components, if necessary with the aid of 1–2% of commercial equalising agent, with 1% acetic acid (60%) at 50°, heat to boiling and keep boiling for one hour, at the same time replenishing with 2% acetic acid (60%).

DYEING PRESCRIPTION B (a) Heat dyeing components with 2% acetic acid (60%) to boiling, dye at boiling point for one hour with addition of 4% formic acid (85%).

(b) Bring the well washed dyeing to the boil with 3% potassium chromate/5% formic acid and chrome dye at boiling point for 1–1½ hours.

The parts given in the examples are parts by weight unless otherwise indicated.

Example 1

1200 parts of a polyester of adipic acid and 65 mol percent of hexanediol and 35 mol percent of 2:2-dimethylpropane-1:3-diol (2.05% OH) are heated with 335 parts of diphenylmethane-4:4'-diisocyanate and 384 parts of chlorobenzene for 50 minutes to 90 to 98° C. and then rapidly cooled to room temperature. NCO content=2.68%.

To a 60° hot solution of 9.40 parts of N-methylamino-bis-(propionic acid hydrazide) and 14.7 parts of p-xylylene-diamine in 1040 parts of dimethylformamide there are added about 25 parts of solid carbon dioxide followed by 430 parts of the above preadduct which is added with vigorous stirring. A solution of viscosity 266 poises/20° C. is obtained which can readily be stirred at room temperature and which flows smoothly even after it has been left to stand for several days.

A smoothly flowing solution of 505 poises/20° C. is obtained by the addition of 22 parts of a 33% rutile paste and 0.4 part of hexane-1:6-diisocyanate followed by 3 parts of butyl isocyanate. The melting point of the elastomer substance is about 265°, softening is observed above 230°.

Filaments obtained by the drying or wet spinning process can be dyed with red or black dye (see Dyeing Prescriptions) to produce deep and fast dyeings.

Filaments obtained by the dry spinning process have the following values when treated for one hour at 130° under a preliminary stretching of 100% on spools:

Titre _____ den__ 121
TS _____ g./den__ 0.45
Elongation _____ percent__ 570
M300 _____ mg./den__ 165
Permanent elongation _____ percent__ 17

Similar results were obtained by using equivalent amounts of ethylene diamine instead of p-xylylene diamine. The dihydrazide employed is obtained from N-methylamino-bis-propionic acid methyl ester and excess hydrazine hydrate by boiling in alcohol. M.P. 119° after recrystallisation from alcohol.

10 parts of solid carbon dioxide are added to a solution of 4.63 parts of p-xylylenediamine in 318 parts of dimethylformamide and thereafter about 68 g. (of 107.5 g. calculated for a complete chain lengthening reaction) of the preadduct solution from Example 1 are introduced slowly with vigorous stirring. A crumbly, swelled mass is formed which only becomes fluid again after prolonged heating at 80 to 100° but immediately solidifies again on cooling. After the addition of 3 parts of butylisocyanate to the hot solution, coatings can be painted with the warm solution on glass plates and dried in 60 minutes at 100°. The elastomer substance is not melted at 270° on the Kofler block.

When cut strips are dyed with 2% red dye of German Patent 230,594 or 10% of black after-chroming dye of German Patent 164,655 (dyeing process A or B), only weakly coloured filaments with poor fastness to washing are obtained.

On exposure to light in the Fade-Ometer, a distinct yellow discolouration is observed after only 10 hours.

Example 2

100 parts of the preadduct solution from Example 1 are vigorously stirred into a hot solution of 8.70 parts of piperazine-N,N'-bis-(propionic acid hydrazide) in 236 parts of dimethyl formamide. The colourless highly viscous solution is poured onto glass plates and converted into elastomer foils by heating at 100°.

The melting point of the foil (Kofler bench) is in the region of 185°.

When dyed with 2% red dye of German Patent 230,594 or 10% after-chroming dye of German Patent 164,655 (dye process A and B) deeply coloured elastomer filaments are obtained. The elastomer foils have exceptional resistance to discolouration on exposure in the Fade-Ometer (colourless up to 100 hours.)

The dihydrazide used is obtained as follows: Piperazine hydrate and ethyl acrylate are left to stand at room temperature for 2 days with a small quantity of ethanol in the molar ratio of 1:2 and volatile constituents are then withdrawn at 12 mm. Hg/100° and the residue, if necessary after distillation in vacuo, is heated for 5 hours under reflux with excess hydrazine hydrate and ethanol as solvent. The dihydrazide separating in crystalline form from the hot solution melts at 200°.

Example 3

500 parts of the polyester from Example 1 are heated to 95 to 100° for 50 minutes with 124 parts of diphenylmethane-4:4'-diisocyanate and 156 parts of chlorobenzene; after cooling to room temperature, the NCO content is 2.075%.

A solution of 9.15 parts of piperazine-N:N'-bis-(propionic acid hydrazide) and 31.3 parts of m-xylylene diamine in 2190 parts of dimethylformamide is reacted, with stirring, with 1025 parts of the preadduct solution, a colourless, highly viscous solution with 510 poises/20° C. being obtained. When left to stand for several hours, the solution is unaltered in its good flow properties.

When filaments (cut from foils) are dyed with 2% red dye of German Patent 230,594 or 10% black after-chroming dye of German Patent 164,655 (dyeing process A or B), intensely red or black coloured elastomer filaments are obtained which have high fastness to washing and a dyeing which is fast to abrasion. Similar results were obtained by using ethylene diamine instead of m-xylene diamine.

Comparable filaments from the above preadduct and m-xylylene-diamine as sole chain extending agent undergo only slight dyeing (pale orange or pale grey) when dyed as described above. The reaction product from the NCO preadduct and m-xyxylenediamine has a pasty consistency after only a few minutes and it is only after prolonged heating that it can be rendered sufficiently fluid while hot to enable it to be spun or cast into foils.

Example 4

300 parts of the polyester from Example 1 (OH number 67.8; acid number 1.6), after one hour's dewatering in vacuo at 130°, are heated with 81.5 parts of diphenylmethane-4:4'-diisocyanate and 164 parts of chlorobenzene for 60 minutes at 95 to 98° and the preadduct solution is then immediately cooled to room temperature.

400 parts of the above preadduct solution are stirred into a 70° hot solution of 5.1 parts of N-methylamino-bis-(propionic acid hydrazide) and 7.88 parts of carbodihydrazide in 759 parts of dimethylformamide, a well flowing solution of 38 poises/20° C. being obtained. By adding 1.15 parts of hexane-1:6-diisocyanate, the viscosity of the solution slowly rises to 695 poises/20°.

The solution is spun through a spinneret of 16 apertures of 0.2 mm. diameter by the dry spinning process and the filaments are heated on spools for one hour at 130° without prestretching and with a prestretching (P) of 50% respectively.

RESULTS

| P, (percent) | Titre, den. | TS, g./den. | Elg., (percent) | M 300, mg./den. | M 150, mg./den. | Tension drop, percent | Permanent elg., percent |
|---|---|---|---|---|---|---|---|
| 0 | 222 | 0.61 | 674 | 104 | 16 | 38 | 16 |
| 50 | 157 | 0.63 | 630 | 147 | 18 | 39 | 16 |

Deep fast dyeings are obtained on the elastomer fibres when the filaments are dyed with the red and black dyes described above.

The melting point of the filaments is in the region of 224° (softening begins at 215° C.). The ηi-Wert value of the elastomer substance $$\left(\eta_i = \frac{\ln \eta_{rel}}{C}\right)$$

c.=10 g·g./l.; measured in hexamethylphosphoramide at 25°) is in the region of 1.02.

Example 5

1200 parts of the polyester from Example 1, 335 parts of diphenylmethane-4:4'-diisocyanate and 389 parts of chlorobenzene are heated to 90° for 30 minutes and then immediately cooled to room temperature. NCO content of the solution=2.72%.

400 parts of the above preadduct solution are stirred into a solution of 5.38 parts of piperazine-N,N'-bis-(propionic acid hydrazide) and 16.05 parts of p-xylylenediamine in 970 parts of dimethylformamide and the highly viscous solution (572 poises/20°) is treated with 25 parts of a 33.3% TiO₂ paste. The solution is spun by the dry spinning process to form highly elastic filaments.

When dyed with red and black dye, deeply coloured elastomer filaments of high fastness to abrasion and washing are obtained. When 2% red dye was used, the dye bath was completely exhausted.

The melting point of the elastomer filaments is above 265°.

Example 6

401 parts of the preadduct solution described in Example 5 are introduced with vigorous stirring into a warm solution of 5.38 parts of piperazine-bis-(propionic acid hydrazide) and 10.62 parts of carbodihydrazide in 930 parts of dimethylformamide, and the mixture treated with 23.5 parts of a 33.3% titanium dioxide solution. The resulting solution of relatively low viscosity is treated with 2.42 parts of a 70% solution of the biuret diisocyanate of hexanediisocyanate (see Houben/Weyl 4th edition, vol. IC/2, page 69), and when a viscosity of 540 poises/20° is reached, further increase in viscosity is prevented by the addition of 2.5 parts of a 0.5 N dimethylhydrazine-chlorobenzene solution.

The solution obtained can be directly spun by the dry or wet spinning process to form highly elastic filaments or poured to form elastic foils.

Elastomer filaments obtained by the dry spinning process (after thermal fixation for 60 minutes at 130° C. on spools under a preliminary stretching (P) of 0.50 and 100%) have the following properties:

| P, percent | Titre, den. | TS, g./den. | Elg., percent | TS (B), g./den. | M 300, mg./den. | M 150, mg./den. | Tension drop, percent | Permanent elg., percent |
|---|---|---|---|---|---|---|---|---|
| 0 | 215 | 0.58 | 640 | 4.30 | 146 | 19 | 31 | 16 |
| 50 | 156 | 0.68 | 575 | 4.60 | 205 | 20 | 43 | 16 |
| 100 | 123 | 0.74 | 490 | 4.30 | 281 | 19 | 45 | 16 |

The $\eta_i$ value of the elastomer substance $$\left(\eta_i = \frac{\ln \eta_{rel}}{C}\right)$$

measured at c.=1 g./100 ml. in hexamethylphosphoramide at 25° is 1.18. The melting point of the elastomers is in the region of 230 to 235° (Kofler block). The content in tertiary amines is about 120 mval./kg. of elastomer substance.

Elastomer foils manifest distinctly improved resistance to discolouration when exposed in the Fade-Ometer. Thus they are still colourless after 20 hours irradiation and they are only yellowish after 50 to 100 hours' exposure whereas comparable elastomers produced by carbodihydrazide as sole chain extending agent are already yellow after only 20 hours. In addition, the filaments or foils produced with only carbodihydrazide as the sole chain extending agent.

When dyed with red (2%) or black (10%) dyes, deeply coloured filaments are obtained, and in the case of the red dye the bath was completely exhausted.

When dyeing with a yellow chrome dye by dyeing process B, colour changes to yellow brown are observed in the chrome bath: these colour changes can be prevented by the previous addition of small quantities of reducing agents (e.g. NaHSO₃, Na₂S₂O₄, hydrazine, carbodihydrazide) to the chrome bath.

Example 7

1000 parts of the preadduct solution from Example 1 are introduced into a solution of 10.67 parts of piperazine-N:N'-bis propionic acid dihydrazide, 4.21 parts of water and 3000 parts of dimethylformamide, a relatively rapid increase in viscosity taking place which is stopped by the addition of 3.6 parts of asymmetrical dimethylhydrazine at a viscosity of 11 poises/20°. Foils cast from the solution are cut into filaments and tested for dyeability. Elastomer filaments are obtained, having a good dyeability and a good dye-fastness.

Example 8

150 parts of the elastomer solution from Example 2 are mixed with 850 parts of an elastomer solution prepared with carbodihydrazide as chain extending agent, and the product is spun by the dry spinning process to form elastomer filaments.

These show good dyeability with red dye (2%), quantitatively extracted dyebath and the black chrome dye.

Preparation of the elastomer solution with carbodihydrazide as chain extending agent:

1200 parts of the polyester from Example 1 are heated with 298 parts of diphenylmethane-4:4'-diisocyanate and 374 parts of chlorobenzene for 50 minutes at 90 to 98°. 870 parts of the preadduct solution formed are reacted in a solution of 20.2 parts of carbodihydrazide in 1840 parts of dimethylformamide and pigmented with 16 parts of titanium dioxide. Elastomers from this solution can only be dyed very inadequately with the above mentioned dyes.

Example 9

600 parts of a polytetramethyleneoxide polyether having —OCO·N(CH$_3$)·CH$_2$·CH$_2$·OH and groups (OH number 60) prepared from polytetrahydrofuran, phosgene and N-methylethanolamine by a process described in U.S. Patent No. 3,365,412 are dewatered for one hour at 130°/12 mm. Hg after the addition of 1.2 ml. of a 35% SO$_2$ solution in dioxane, and then heated with 136.5 parts of dimethylmethane-4:4′-diisocyanate and 316 parts of chlorobenzene for 2 hours at 98° (NCO content after cooling=1.91%).

420 parts of the NCO preadduct solution prepared as described above are added with vigorous stirring into a hot solution of 3.78 parts of piperazine-N:N′-bis(propionic acid hydrazide) and 7.50 parts of carbodihydrazide in 753 parts of dimethylformamide, the homogeneous solution is treated with 21.8 g. of a 33% TiO$_2$/dimethylformamide paste, and the viscosity is adjusted to 540 poises/20° by addition of 0.27 part of hexane-1:6-diisocyanate.

The solution is spun by the dry spinning process through a spinneret of 16 apertures of 0.20 mm. diameter each, the filaments are withdrawn from the spinning shaft at speed of 100 m./min. and wound onto spools at a speed of 100, 150 and 200 m./min. respectively (P=0, 50, 100%), and the spools are heated in a vacuum drying cupboard for one hour at 130°.

Depending on the preliminary stretching, the following elastic and mechanical values are obtained:

| P, (percent) | Titre, den. | TS, g./den. | Elg., (percent) | M 300, mg./den. | M 150, mg./den. | Tension drop, percent | Permanent elg., percent |
|---|---|---|---|---|---|---|---|
| 0 | 220 | 0.58 | 780 | 100 | 14 | 34 | 16 |
| 100 | 130 | 0.59 | 645 | 180 | 14 | 39 | 16 |

When dyed with acid dyes, e.g. the red or black dye, deep red and deep black dyeings respectively are obtained whereas a comparison test carried out without the addition of piperazine dipropionic acid hydrazide yields only very inadequate dyeings. Fade-Ometer exposure of filaments and of foils cast from the elastomer solution shows no discolouration whatsoever up to 100 Fade-Ometer hours and the strength of the filaments is also maintained. Comparable substances without the modification according to the invention undergo very much more rapid discolouration and more deterioration in the mechanical properties.

Example 10

1200 parts of the polyester described in Example 1, 316 parts of diphenylmethane-4:4′-diisocyanate and 379 parts of chlorobenzene are heated for 50 minutes at 95° C.

450 parts of this NCO preadduct solution are in each case reacted as already described above with piperazine-N,N′-bis-(propionic acid hydrazide) (PPH) and/or carbodihydrazide (CDH) dissolved in a quantity of dimethylformamide such that a 25% elastomer solution is formed (see table). The viscosity of the elastomer solution is adjusted to 500 to 650 poises/20° C. by the addition of small quantities of hexamethylene-1:6-diisocyanate.

| As chain lengthening agent | | | | Viscosity of the 25% elastomer solution |
|---|---|---|---|---|
| PPH in mol percent | CDH in mol percent | PPH in parts | CDH in parts | |
| 100 | | 34.2 | | 650 |
| 50 | 50 | 17.1 | 6.6 | 500 |
| 30 | 70 | 10.28 | 9.25 | 500 |
| 15 | 85 | 5.14 | 11.22 | 600 |
| | 100 | | 13.2 | 650 |

The colourless elastomer solutions are cast onto glass plates and dried at 100° C. The elastomer films obtained are cut up into elastomer filaments with a foil cutting machine and these filaments are exposed in an Atlas Fade-Ometer for 0, 20, 40, 60 and 100 hours. The results show a marked improvement in the resistance of the elastomer substances to light with increasing content of piperazine-bis-propionic acid dihydrazide (see table).

Similar good results are achieved when piperazine-bis-propionic acid dihydrazide is replaced by N:N′-dimethylethylene - diamine-N,N′-bis-(propionic acid hydrazide) (M.P. 130 to 131° C.) This dihydrazide is prepared from N:N′-dimethylethylene diamine and acrylic acid methyl ester and hydrazinolysis of the resulting ester with hydrazine hydrate.

When applied to fabrics by doctor blades, spraying or immersion, the elastomer solutions give rise to high grade coatings which are fast to light and substantially resistant to hydrolysis, and if desired they may be used for the production of microporous films on foundations.

FADE-OMETER EXPOSURE OF CUT FILAMENTS (FROM FOILS) UNPIGMENTED
[Chain lengthening with varying proportions of piperazine-N:N′-bis-propionic acid hydrazide (PPH) and carbodihydrazide (CDH)]

| Composition | Exposure time (Fade-Ometer) (in hours) | Titre, den. | TS, g./den. | Elongation, percent | TS breaking titre, g./den. | M 300/1 | M 150/3r | Permanent elongation percent | Colour of threads |
|---|---|---|---|---|---|---|---|---|---|
| 100% PPH | 0 | 1,306 | 0.77 | 584 | 5.29 | 90 | 20 | 21 | Colorless. |
| 50% PPH/50% CDH | | 1,262 | 0.81 | 640 | 6.00 | 97 | 23 | 19 | Do. |
| 30% PPH/70% CDH | | 1,456 | 0.78 | 704 | 6.30 | 96 | 23 | 16 | Do. |
| 15% PPH/85% CDH | | 1,871 | 0.72 | 683 | 5.62 | 103 | 23 | 13 | Do. |
| 100% CDH | | 1,876 | 0.74 | 703 | 5.98 | 105 | 23 | 13 | Do. |
| 100% PPH | 20 | 1,284 | 0.73 | 588 | 4.98 | 105 | 22 | 20 | Colorless. |
| 50% PPH/50% CDH | | 653 | 0.64 | 535 | 4.09 | 114 | 23 | 16 | Do. |
| 30% PPH/70% CDH | | 852 | 0.51 | 510 | 3.12 | 121 | 26 | 16 | Do. |
| 15% PPH/85% CDH | | 908 | 0.47 | 490 | 2.74 | 127 | 25 | 14 | Pale yellowish. |
| 100% CDH | | 797 | 0.38 | 464 | 2.16 | 132 | 23 | 16 | Yellow. |
| 100% PPH | 40 | 610 | 0.67 | 510 | 4.11 | 132 | 23 | 20 | Colourless. |
| 50% PPH/50% CDH | | 641 | 0.67 | 471 | 3.86 | 133 | 28 | 18 | Almost colourless. |
| 30% PPH/70% CDH | | 766 | 0.49 | 471 | 2.81 | 122 | 26 | 19 | Pale yellowish. |
| 15% PPH/85% CDH | | 902 | 0.31 | 405 | 1.54 | 146 | 26 | 15 | Yellow. |
| 100% CDH | | 739 | 0.08 | 140 | 0.20 | | | | Yellow brown. |
| 100% PPH | 60 | 614 | 0.66 | 542 | 4.21 | 140 | 21 | 20 | Almost colourless. |
| 50% PPH/50% CDH | | 648 | 0.45 | 492 | 3.60 | 138 | 23 | 19 | Pale yellowish. |
| 30% PPH/70% CDH | | 790 | 0.30 | 407 | 1.54 | 133 | 23 | 21 | Yellowish. |
| 15% PPH/85% CDH | | 965 | 0.14 | 290 | 0.56 | | | | Yellow. |
| 100% CDH | | | | | | | | | Yellow brown. |
| 100% PPH | 100 | 613 | 0.57 | 466 | 3.19 | 142 | 22 | 22 | Almost colourless. |
| 50% PPH/50% CDH | | 762 | 0.35 | 421 | 1.83 | 136 | 23 | 28 | Pale yellowish. |
| 30% PPH/70% CDH | | 999 | 0.14 | 285 | 0.52 | | | | Yellowish/yellow. |
| 15% PPH/85% CDH | | | | | | | | | Intense yellow. |
| 100% CDH | | | | | | | | | Brownish yellow. |

Example 11

1200 parts of the polyester described in Example 1 are heated with 204 parts of toluylene diisocyanate (65 parts of 2:4- /35 parts of 2:6-isomer) and 352 g. of chlorobenzene for 3 hours at 95° C. NCO content after cooling =1.97%.

1000 parts of the above NCO preadduct solution are introduced into a solution of 16.15 parts of piperazine-N,N'-bis-(acetic acid hydrazide) and 14.75 parts of carbodihydrazide in 2500 parts of dimethylacetamide. Filaments foils or coatings produced from this substance can be dyed very well with anionic dyes and show a markedly improved fastness to light. Piperazine-N:N'-bis-acetic acid hydrazide, M.P. 231 to 233° C., is obtained by hydrazinolysis of piperazine-N:N'-diacetic acid diethyl ester obtainable by reacting piperazine with chloroacetic acid ethyl ester.

What we claim is:

1. A polyurethane elastomer having an essentially linear segmented structure, consisting of the reaction product of an NCO-preadduct from a diisocyanate and an essentially linear polyhydroxy compound having terminal hydroxyl groups and a molecular weight from about 500 to about 5000 with an organic nitrogen-containing chain extender compound, said polyurethane elastomer containing a repeating unit having at least one tertiary nitrogen atom and the formula

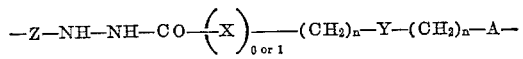

wherein A is a member of the group consisting of the O-group, the >NH-group and the group

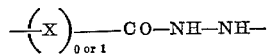

X is a member of the group consisting of oxygen, the NH-group and the >N-R group; Y is a bifunctional radical consisting of the piperazine radical, an alkylpiperazine radical, the radical

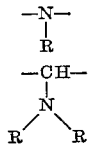

and

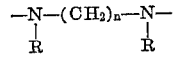

R is lower alkyl, Z an aromatic bivalent radical resulting from toluylene diisocyanate or 4,4'-diphenylmethane diisocyanate and $n$ an integer from 1 to 6; said repeating unit being present in an amount of according 20 to 1000 milliequivalents of tertiary nitrogen per kg. of said polyurethane elastomer.

2. The polyurethane elastomer of claim 1, wherein said organic nitrogen-containing chain extender compound is N,N'-piperazino-bis-(propionic acid-hydrazide).

3. A polyurethane elastomer having an essentially linear segmented structure, consisting of the reaction product of an NCO-preadduct from a diisocyanate and an essentially linear polyhydroxy compound having terminal hydroxyl groups and a molecular weight from about 500 to about 5000 with an organic nitrogen-containing chain extender compound, said polyurethane elastomer containing a repeating unit (a) having at least one tertiary nitrogen atom of the formula

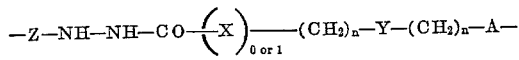

wherein A is a member of the group consisting of the O-group, the >NH-group and the group

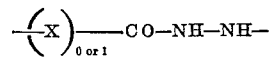

X is a member of the group consisting of oxygen, the NH-group and the >N-R group; Y is a bifunctional radical consisting of the piperazine radical, an alkylpiperazine radical, the radical

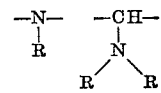

and

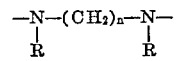

R is lower alkyl, Z an aromatic bivalent radical resulting from toluylene diisocyanate or 4,4'-diphenylmethane diisocyanate and $n$ an integer from 1 to 6; said repeating unit being present in an amount of according 20 to 1000 milliequivalents of tertiary nitrogen per kg. of said polyurethane elastomer and a repeating unit (b) of the formula

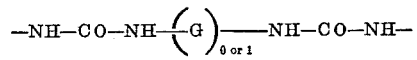

wherein G is a member of the group consisting of an alkylene, a cycloalkylene, a xylylene and the group

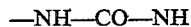

at least some of said units being connected by urethane linkages being attached to the residues of the linear polyhydroxy compound; said repeating unit being present in an amount according to 20 to 400 milliequivalents of tertiary nitrogen per kg. of said polyurethane elastomer.

4. The polyurethane elastomer of claim 3, wherein said essentially linear polyhydroxy compound is a polyester from adipic acid and a diol selected from the group consisting of 2,2-dimethylpropanediol-1,3 and hexanediol-1,6 and mixtures thereof, said polyester having a melting point of below +60° C.

5. The polyurethane elastomer of claim 3, wherein said essentially linear polyhydroxy compound is a poly-(tetramethylenoxide)-diol, having a melting point of below +60° C.

6. The polyurethane elastomer of claim 3, wherein said diisocyanate is diphenylmethane-4,4'-diisocyanate.

7. The polyurethane elastomer of claim 3, wherein said nitrogen-containing chain extenders are N,N'-piperazinobis-(γ-propionicacid-hydrazide) and ethylene diamine.

8. The polyurethane elastomer of claim 3, wherein said nitrogen-containing chain extenders are N,N'-piperazinobis-(γ-propionicacid-hydrazide).

9. The polyurethane elastomer of claim 3, wherein said nitrogen-containing chain extenders are N,N'-piperazinobis-(γ-propionicacid-hydrazide) and carbohydrazide.

10. The polyurethane elastomer of claim 3, wherein said nitrogen-containing chain extenders are N-methyl-bis-(propionicacid-hydrazide and carbohydrazide.

11. A polyurethane-fiber consisting of a polyurethane containing a repeating unit (a) having at least one tertiary nitrogen atom of the formula

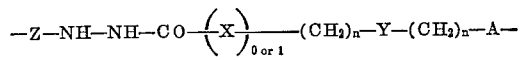

wherein A is a member of the group consisting of the O-group, and >NH-group and the group

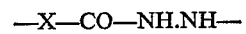

X is a member of the group consisting of oxygen, the NH group and the N-R group; Y is a bifunctional radical consisting of the piperazine radical, an alkylpiperazine radical, the radical

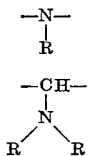

and

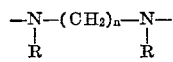

R is lower alkyl, Z an aromatic bivalent radical resulting from toluylene diisocyanate or 4,4'-diphenylmethane diisocyanate and $n$ an integer from 1 to 6; said repeating unit being present in an amount of according 20 to 1000 milliequivalents of tertiary nitrogen per kg. of said polyurethane elastomer and a repeating unit (b) of the formula

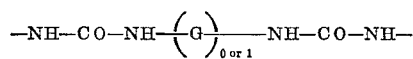

wherein G is a member of the group consisting of an alkylene, a cycloalkylene, a xylylene and the group

—NH—CO—NH— at least some of said units being connected by urethane linkages being attached to the residues of the linear polyhydroxy compound; said repeating unit being present in an amount according to 20 to 400 milliequivalents of tertiary nitrogen per kg. of said polyurethane elastomer.

References Cited

UNITED STATES PATENTS

| | | | |
|---|---|---|---|
| 2,957,852 | 10/1960 | Frankenburg et al. | 260—75 |
| 3,004,945 | 10/1961 | Farago | 260—77.5 X |
| 3,149,998 | 9/1964 | Thurmaier | 260—77.5 X |
| 3,202,636 | 8/1965 | Windemuth et al. | 260—75 |
| 3,305,533 | 2/1967 | Thoma et al. | 260—75 |

DONALD E. CZAJA, Primary Examiner

M. J. WELSH, Assistant Examiner

U.S. Cl. X.R.

8—4; 260—77